United States Patent [19]
Sylvester

[11] 4,086,465
[45] Apr. 25, 1978

[54] ELECTRIC SOLDERING IRON

[75] Inventor: Joseph A. Sylvester, San Dimas, Calif.

[73] Assignee: Solder Removal Co., Covina, Calif.

[21] Appl. No.: 646,313

[22] Filed: Jan. 2, 1976

[51] Int. Cl.² .......................... H05B 3/06; B23K 3/04; H01R 13/58
[52] U.S. Cl. ................................ 219/236; 16/116 R; 174/135; 219/238; 219/533; 228/55; 339/58; 339/105
[58] Field of Search ......................... 219/221, 227–242, 219/533, 531; 228/51–55; 174/135; 339/58, 105; 16/116 R

[56] References Cited

U.S. PATENT DOCUMENTS

| 1,372,778 | 3/1921 | Sands | 219/238 |
| 1,535,498 | 4/1925 | Roe | 219/236 X |
| 2,073,259 | 3/1937 | Young | 219/533 X |
| 2,592,426 | 4/1952 | Jeffrey | 219/236 UX |
| 2,711,470 | 6/1955 | Schoenwald | 219/240 X |
| 3,141,088 | 7/1964 | Johnson | 219/236 |
| 3,188,448 | 6/1965 | Weller | 219/241 |
| 3,264,449 | 8/1966 | Brenner | 219/227 |

FOREIGN PATENT DOCUMENTS

| 643,234 | 5/1964 | Belgium | 219/229 |
| 2,209,222 | 8/1973 | Germany | 219/227 |

*Primary Examiner*—A. Bartis
*Attorney, Agent, or Firm*—Nilsson, Robbins, Dalgarn, Berliner, Carson & Wurst

[57] ABSTRACT

An electric soldering iron is disclosed incorporating a front end to provide a heated working tip, the elongate, somewhat cylindrical structure of the tip defining an annular groove to receive a ring for retaining engagement with a threaded collar. The portion of the front end remote from the tip terminates in a radial-flange fastener structure which is affixed to the ends of a pair of elongated handle members that mate together to define a somewhat symmetrical handle, having an irregular internal passage for anchoring the cord (energizing electrical conductors) and relieving stress. As disclosed, a pair of sliding collars are disposed on the handle members for locking the assembly together. One of the collars (adjacent the front end) is internally tapered and defines ridges to engage the handle members so as to provide air spaces for heat shielding and insulating the handle. The handle defines corners as a result of a triangular sectional configuration to inhibit rolling from a rest position.

6 Claims, 5 Drawing Figures

ELECTRIC SOLDERING IRON

BACKGROUND AND SUMMARY OF THE INVENTION

A wide variety of different forms of electric soldering irons have been proposed in the past with the result that the art has reached a relatively advanced state. Somewhat recent forms of such irons are disclosed, for example, in U.S. Pat. Nos. 3,287,541 (Weller et al); 3,336,462 (Fuller); 3,410,472 (Weller et al); and 3,786,229 (Hombrecher).

The desirable characteristics of an electric soldering iron involve a variety of considerations. For example, the tip of the iron should be easily removable for convenient replacement or refurbishing. As a related consideration, the entire iron should be relatively simple and easy to assemble and break down so as to facilitate the initial manufacture as well as subsequent repair. Another important consideration involves effectively heat shielding or insulating the handle so that the user's hand is not subject to discomfort or injury. Other considerations involve economy of manufacture, safety in use, effectiveness to provide a heated working surface at the tip, and the ability to withstand elevated temperatures and use for long periods of time. Finally, the iron should be compact, convenient to use, and rugged, specifically with regard to the cord serving to energize the iron.

Although irons of various structural forms have been proposed with the objective of satisfying these considerations, a need continues to exist for an improved electric soldering iron. In general, the iron of the present invention affords such an improved structure.

The present invention involves structural aspects of both the front end and the handle of a soldering iron. Somewhat more specifically, the tip of the front end (providing the heated working surface) is grooved annularly to receive a holder ring which is then clamped between a collar and a front-end barrel that contains the heating element embedded in magnesium oxide. Conductors extend to plug in contacts that are rigidly supported.

At a location opposed to the tip of the front end, the barrel defines a radial flange which is fixed to the ends of a pair of mating handle members. In combination, the handle members define an irregular passage for lockingly engaging the sheathed conductors passing from the front end through the length of the handle.

The handle is held together in the disclosed embodiment by a pair of sliding collars, one of which incorporates ridges to define an air space between the handle members and the collar which also incorporates a flange to afford additional heat shielding and furthermore to provide cornered edges which inhibit the iron from rolling.

BRIEF DESCRIPTION OF THE DRAWINGS

The drawings, disclosing an illustrative embodiment of the invention to present the various advantages and objects thereof, are as follows.

DESCRIPTION OF THE ILLUSTRATIVE EMBODIMENT

As indicated above, a detailed illustrative embodiment of the invention is disclosed herein. However, embodiments may be constructed in accordance with various other forms, some of which may be rather different from the disclosed embodiment herein. Consequently, specific structural and functional details disclosed herein are more representative, yet in that regard they are deemed to provide the best embodiment for purposes of disclosure and to establish a foundation as the basis for the claims herein which define the scope of the present invention.

Figure 1:
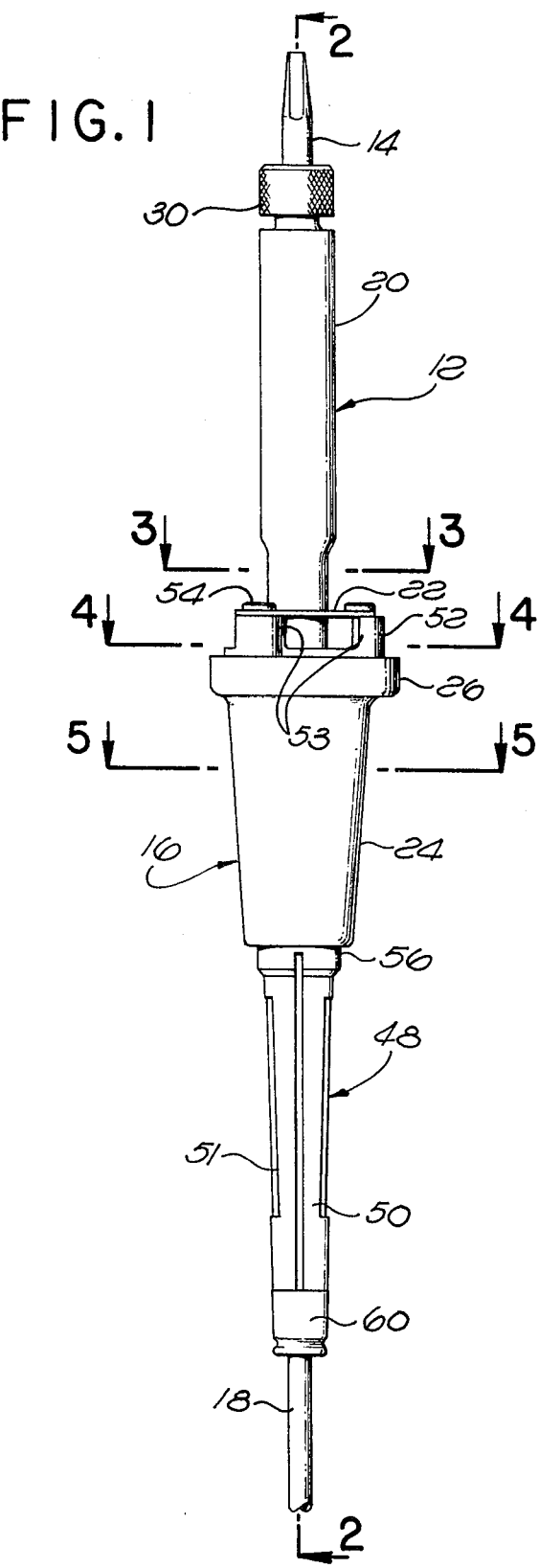
FIG. 1 is a side elevation of an electric soldering iron constructed in accordance with the present invention.

Referring initially to FIG. 1, the iron constructed in accordance with the present invention includes a front end 12 incorporating a tip 14 for providing a working surface. The front end 12 is affixed to a handle 16 which carries a cord 18 to provide electrical energy for heating the tip 14. In accordance with standard practice, the cord 18 is connected to a source of electrical energy (not shown) for providing electrical current through individual conductors to the front end 12 as well as grounding that structure.

Figure 3:
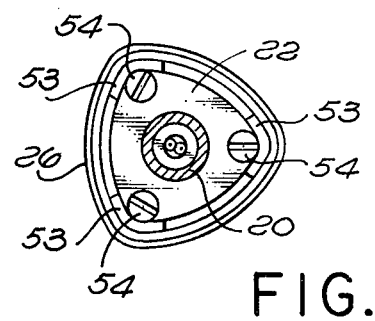
FIG. 3 is a horizontal sectional view taken along line 3—3 of FIG. 1.

The tip 14 is received in a barrel 20, the lower end of which (as depicted) is of reduced diameter and a radial flange 22 (triangular—FIG. 3) is affixed to the handle 16. A pair of mating members form the base of the handle 16 (FIG. 1) and are described in greater detail below, being held together by a sliding collar 24 which also functions to afford heat shielding and insulation, and to define an irregular peripheral surface 26 which inhibits the iron against rolling.

Figure 2:
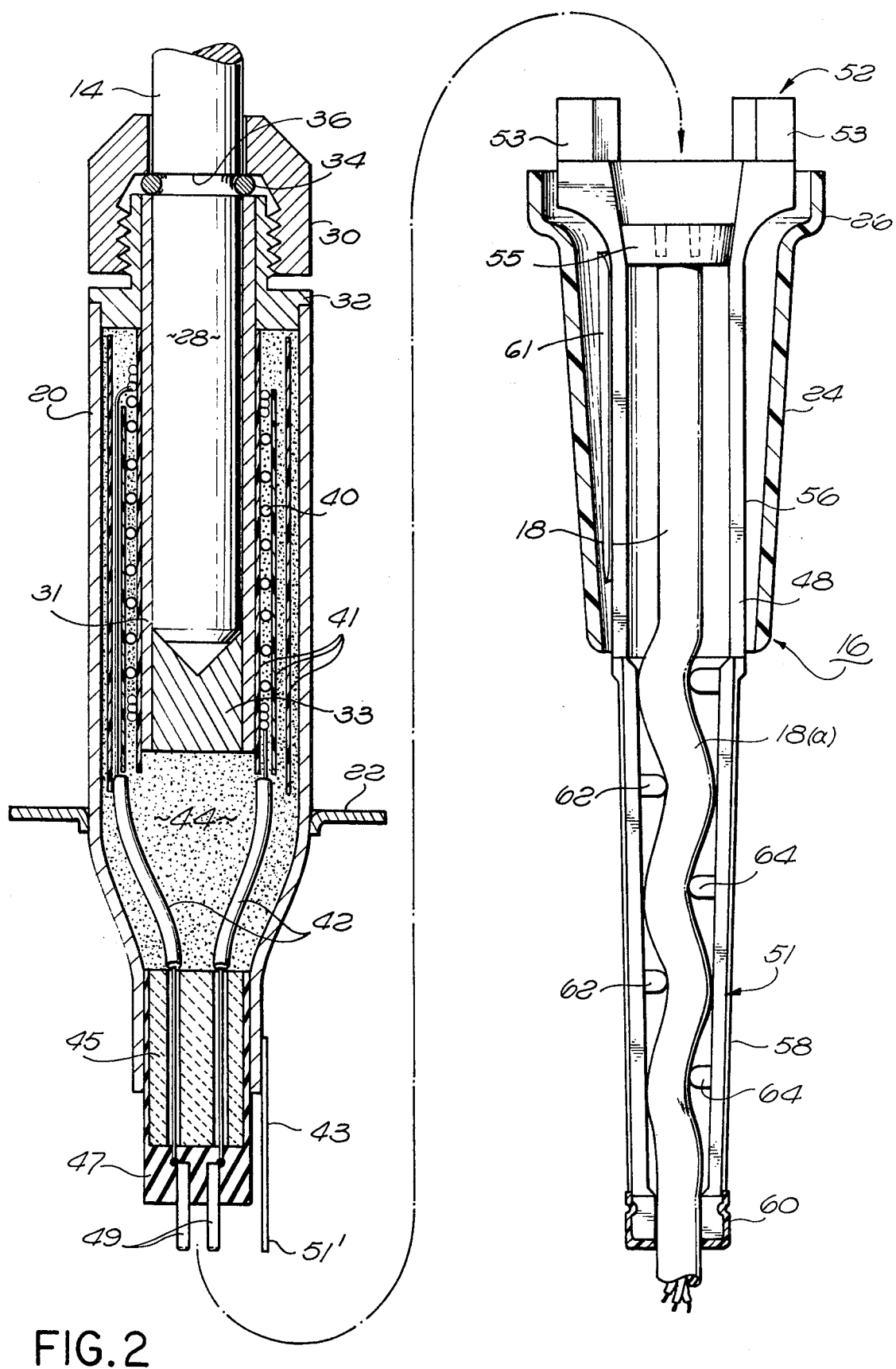
FIG. 2 is a divided full vertical sectional view taken through the iron of FIG. 1.

Considering the electric soldering iron as disclosed herein in somewhat greater detail, reference will now be made to FIG. 2 showing the tip 14 to comprise an elongate cylindrical section 28 which extends well into the barrel 20. Specifically, the tip 14 passes through a collar 30 which is threadably received on an end block 32 welded into the barrel 20 and fixed to a steel tube 31. The tip 14 is held concentrically within the collar 30 and the block 32 by the engagement of a ring 34 being fixed between those members and received in an annular groove 36 defined in the cylindrical section 28 of the tip 14. A slug 33 closes the tube 31 and contacts the tip 14.

Within the barrel block 32, as depicted, the cylindrical section 28 of the tip 14 is telescopically received in the tube 31 which supports a heating coil 40 shielded by layers 41 of mica. The coil 40 is bifilar wound and is electrically connected to a pair of conductors 42 bearing fiber glass insulation. A conductor 43 is connected electrically to the barrel 20 as by a weld contact. The space which would otherwise exist in the barrel 20 is filled with a powdered packing 44 of magnesium oxide. Consequently, the conductors 42 as well as the coil form 38 are rigidly supported in the barrel 20. The conductors 42 exit from the barrel 20 through an insulation block 45 and a potted section 47 to provide A.C. contacts 49 along with a ground contact 51' for plug connection with the handle 16.

Figure 4:
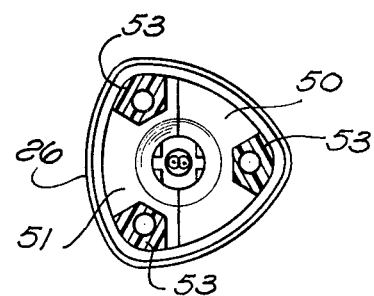
FIG. 4 is a horizontal sectional view taken along line 4—4 of FIG. 1.
Figure 5:
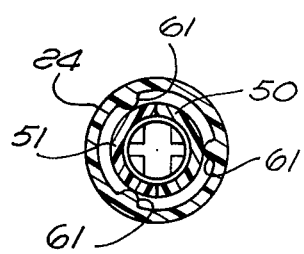
FIG. 5 is a horizontal sectional view taken along line 5—5 of FIG. 1.

The basic portion of the handle 16 consists of a pair of elongated handle members 50 and 51 (FIGS. 1 and 5) which are mated together in facing relationship. Essentially, each of the members 50 and 51 is a mirror image of the other, with the two together defining the somewhat tubular base 48 of the handle 16. As so defined, the base 48 includes a fastening portion 52 adjacent the front end 12, incorporating three axial risers 53 (FIGS. 1 and 4) which receive threaded studs 54 passing through the flange 22. A connection receptacle 55 is seated in the handle to receive the contacts 49 and 51'.

Beneath the fastening portion 52 of the handle 16 (FIG. 5) the diameter of the base 48 reduces to define a cylindrical section 56 which receives the tapered collar 24 with the flanged surface 26 (FIG. 4) of somewhat triangular shape. As illustrated, the sliding collar 24 is of reducing internal diameter (from the head end 12) for engagement with the handle members 50 and 51 along the ridges 61. Below the cylindrical section 56 as depicted (FIG. 2) the base 48 incorporates a tapered section 58 of lesser diameter, the end of which receives a friction-fitted collar 60 for further fixing the members 50 and 51 in mated relationship.

The collar 24 also holds the handle members 50 and 51 together; however, contact between these components is through radially spaced-apart ridges 61 (FIG. 5) which extend internally from the collar 24 to contact the members 50 and 51. It is to be noted that the axially parallel ridges 61 afford segmented air spaces between the collar 24 and the handle base 48 so as to afford additional heat insulation and cooling for the surfaces contacted by a person using the iron.

Referring to FIG. 2, the internal passage is shown inside the handle base 48 which passage is occupied by the cord 18 comprising the sheathed conductors 42 and 43. The cord 18 is crimped by offset abutments 62 and 64 extending radially into the somewhat cylindrical passage from opposite sides of the member 51. As a consequence, the cord 18 is anchored or locked within the handle 48 and tension applied to the cord 18, as from outside the structure of the iron, is effectively accepted in the serpentine section 18a of the cord 18 which lies within the handle base 48.

Considering the manufacture of irons of the preferred embodiment, the components generally may be produced by the use of conventional manufacturing processes. Specifically, the tip 14 (FIG. 2) may be made by machining copper and if desired may be plated as with iron or various alloys. The other components of the front end 12 may be formed by well known metal shaping and forming processes. Somewhat similarly, the components of the handle may be formed by conventional plastic molding techniques.

In assembling the iron as disclosed herein, the front end 12 is initially formed as a subassembly with the components in an operating position. Specifically, the barrel 20 is spot welded to the end block 32 along with the tube 31 and the coil 40 is positioned thereon so that the conductors 42 exit through the block 45. The powdered packing 44 is then placed in the barrel 20 and the potted section 47 closes the end of the barrel 20.

To complete the subassembly of the front end 12, the tip 14, with the ring 34 fitted into the annular groove 36, is inserted through the end block 32 after which the collar 30 is threaded onto the threaded section of the end block 32 to clampingly engage the ring 34 locking the tip 14 in position.

The assembly of the complete iron then involves fitting the contacts 49 and 51' into the receptacle 55 in the handle member 51 (FIG. 2) with the serpentine section 18a of the cord conformed in the irregular passage. Next, the handle member 51 is mated to the handled member 50 after which the studs 54 are set to fasten the handle 16 to the front end 12. Finally, the collars 24 and 60 are slipped into position so that the entire assembly is locked into an integral operating unit.

In using an electric soldering iron in accordance with the present invention, it is to be noted that several characteristic advantages result. First, it may be seen that the tip 14 can be easily replaced simply by removing the nut or collar 24, withdrawing an old tip, and inserting a fresh one. Also, in the event of any failures in the electrical connection structure, access is simply by sliding the friction collars 24 and 60 off of the base handle 48 and parting the two handle members 50 and 51.

In using the iron it is to be noted that locations of the handle which are contacted by a user's hand are well shielded from heat. Specifically, the collar 24 is separated from the handle by air spaces and additionally the flared section of the handle providing the surface 26 functions as a heat shield from the front end 12. A further consideration attendant the use of the iron resides in the fact that it will not readily roll as from a tilted surface. In that regard, the peripheral surface 26 defines corners (FIG. 4) which resist rolling motion by the iron in the event that it is laid on a sloping surface.

As indicated above, the embodiment described herein is deemed best for the purposes hereof; however, recognizing various modifications are apparent, the scope hereof shall be deemed to be as defined by the claims as set forth below.

What is claimed is:

1. An electric soldering iron comprising:
   a front end assembly having a tip at one end defining a working surface, a fastening structure at the opposed end of said assembly including a radial flange and means defining a central opening at said opposed end into said front end assembly, said front end assembly further including electric heating means for heating said tip;
   electrical conductors connected to said heating means and passing outwardly from the opposed end of said front end assembly through said central opening;
   a pair of elongated unitary handle members mated together in side-by-side facing relationship to define a central passage of serpentine shape;
   a flexible power cord connected to said conductors passing out of said front end assembly through said central opening, said power cord extending through said serpentine passage and being held against movement thereby;
   means fixing said handle members to the opposed end of said front end assembly with said handle members in abutment with said radial flange; and
   a longitudinally slidable tubular collar disposed on and surrounding said pair of mated handle members immediately adjacent said radial flange, said collar having a plurality of radially spaced apart internal ridges engaged with the outer surface of said mated handle members for holding said members in mated relationship and spacing said collar therefrom whereby to provide open spaces between said collar and said mated handle members.

2. An electric soldering iron according to claim 1 further including a second collar for additionally holding said handle members together, located about the ends of said handle members remote from said tubular collar.

3. An electric soldering iron according to claim 1 wherein said slidable collar further includes a flanged section at its forward end extending radially of said slidable collar.

4. An electric soldering iron according to claim 3 wherein said flanged section of said slidable collar is substantially of triangular configuration.

5. An electric soldering iron according to claim 1 wherein said handle members define axially-extending projections and wherein said projections abut said radial flange and are affixed thereto thereby forming the means for fixing said handle members in abutment with said radial flange.

6. An electric soldering iron according to claim 1 wherein said sliding collar is of reducing internal diameter from a large diameter at its forward end to a small diameter at its rear end, whereby the open spaces between the collar and mated handle members increase in size from the rear end to the forward end of the collar.

* * * * *